(12) United States Patent
Terasawa

(10) Patent No.: US 8,065,548 B2
(45) Date of Patent: Nov. 22, 2011

(54) POWER SUPPLY CONTROLLING APPARATUS AND POWER SUPPLY CONTROLLING SYSTEM

(75) Inventor: Yuichiro Terasawa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 471 days.

(21) Appl. No.: 12/379,762

(22) Filed: Feb. 27, 2009

(65) Prior Publication Data

US 2009/0217064 A1 Aug. 27, 2009

(30) Foreign Application Priority Data

Feb. 27, 2008 (JP) ................................. 2008-046874

(51) Int. Cl.
*G06F 1/26* (2006.01)
(52) U.S. Cl. .......................... 713/340; 713/323; 323/283
(58) Field of Classification Search .................. 713/340, 713/323; 323/283
See application file for complete search history.

(56) References Cited

U.S. PATENT DOCUMENTS

| | | | |
|---|---|---|---|
| 6,920,614 B1 * | 7/2005 | Schindler et al. | 715/726 |
| 6,968,466 B2 * | 11/2005 | Bolian et al. | 713/300 |
| 2006/0263066 A1 * | 11/2006 | Matsumoto | 386/107 |

FOREIGN PATENT DOCUMENTS

| | | |
|---|---|---|
| JP | 09-065262 | 3/1997 |
| JP | 2005-318004 | 11/2005 |
| JP | 2006-172186 | 6/2006 |

* cited by examiner

*Primary Examiner* — Thuan Du
(74) *Attorney, Agent, or Firm* — Staas & Halsey LLP

(57) ABSTRACT

A power supply controlling apparatus includes: a first determination portion that determines whether a power supply is output from an information processing apparatus that outputs a video signal and is connected to the power supply controlling apparatus; a second determination portion that, when it is determined that the power supply is output from the information processing apparatus, determines whether a switch signal that indicates turning off a power supply of a power supply device supplying the power supply to the information processing apparatus has been received from a remote device outputting the switch signal in response to the depression of a switch, the power supply device and the remote device being connected to the power supply controlling apparatus; and a discard portion that discards the switch signal when it is determined that the switch signal has been received from the remote device.

8 Claims, 4 Drawing Sheets

POWER SUPPLY CONTROLLING APPARATUS AND POWER SUPPLY CONTROLLING SYSTEM

BACKGROUND OF THE INVENTION

1. Field of the Invention

The present invention relates to a power supply controlling apparatus which is connected to an information processing apparatus outputting a video signal and a power supply device supplying a power supply to the information processing apparatus, and a power supply controlling system which has a remote device that indicates turning on or off the power supply of the power supply device, and the power supply controlling apparatus.

2. Description of the Related Art

Conventionally, there has been known technique that controls turning on and off, and resetting a power supply of a personal computer from a remote telephone terminal (see Japanese Laid-Open Patent Publication No. 2005-318004). Also, there has been conventionally known technique that controls a power supply of a computer from a remote user terminal (see Japanese Laid-Open Patent Publication No. 2006-172186).

When the power supply of the computer is controlled by remote control, if a signal turning off the power supply of the computer is sent from a remote terminal to the computer by accident, there is a problem that data of the computer under operation is deleted.

SUMMARY OF THE INVENTION

It is an object of the present invention to provide a power supply controlling apparatus and a power supply controlling system that can avoid controlling a power supply by an erroneous instruction.

According to an aspect of the present invention, there is provided a power supply controlling apparatus including: a first determination portion that determines whether a power supply is output from an information processing apparatus that outputs a video signal and is connected to the power supply controlling apparatus; a second determination portion that, when it is determined that the power supply is output from the information processing apparatus, determines whether a switch signal that indicates turning off a power supply of a power supply device supplying the power supply to the information processing apparatus has been received from a remote device outputting the switch signal in response to the depression of a switch, the power supply device and the remote device being connected to the power supply controlling apparatus; and a discard portion that discards the switch signal when it is determined that the switch signal has been received from the remote device.

With the above arrangement, even when a user depresses the switch of the remote device by accident while operating the information processing apparatus, the switch signal is discarded. It is therefore possible to avoid controlling the power supply of the power supply device by an erroneous instruction. Moreover, data that is being edited in the information processing apparatus can be prevented from being deleted by the user's erroneous instruction.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of an embodiment of the present invention.

Figure 1:
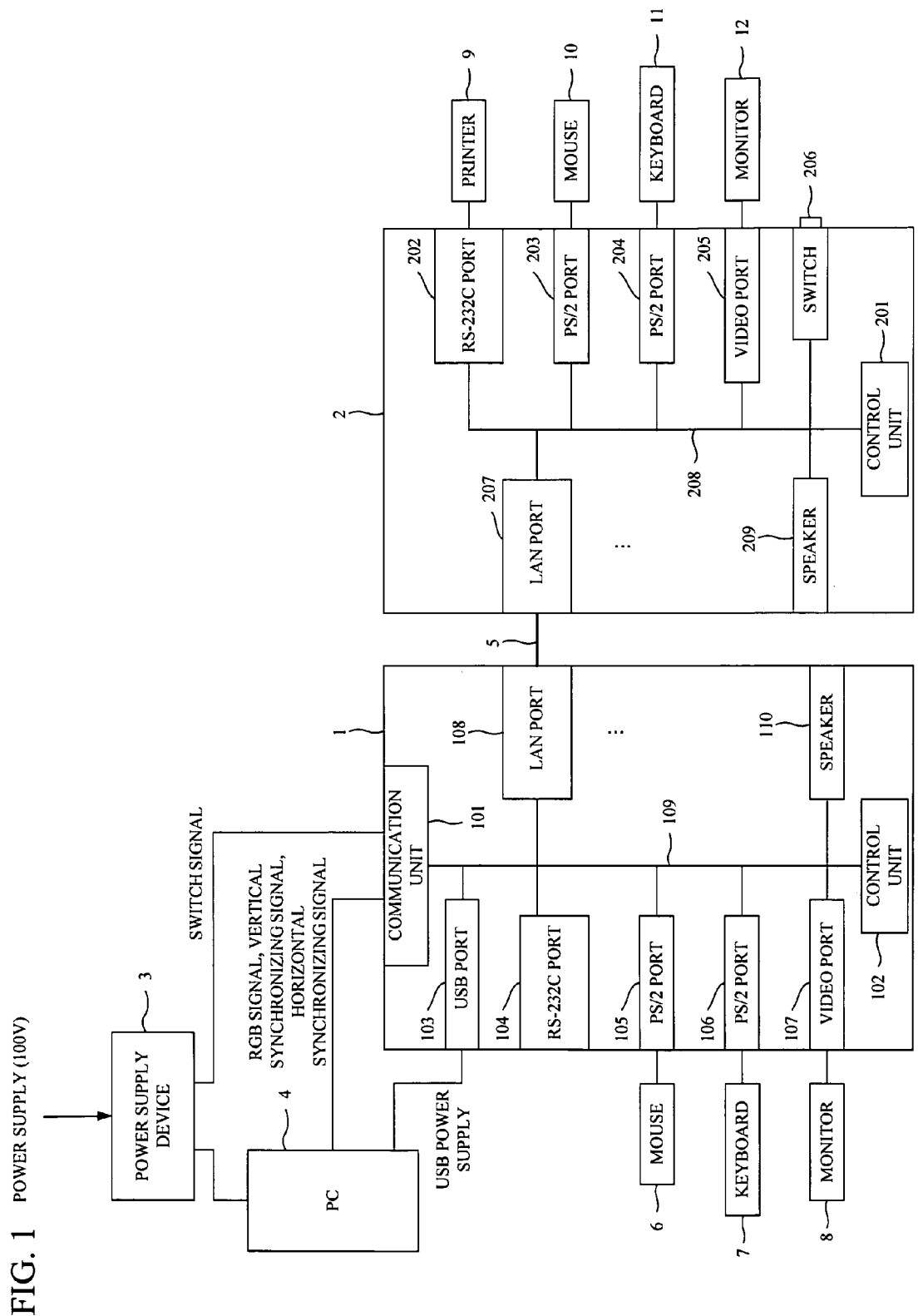
FIG. 1 is a schematic diagram showing the construction of a power supply controlling system according to an embodiment of the present invention.

FIG. 1 is a schematic diagram showing the construction of a power supply controlling system according to an embodiment of the present invention.

As shown in FIG. 1, the power supply controlling system includes a power supply controlling apparatus 1, a remote device 2, a power supply device 3, a computer 4 (hereinafter referred to as "PC"), and a LAM (local area network) cable 5 as a network cable.

The power supply controlling apparatus 1 includes: a communication unit 101 (an output portion) that transmits to the power supply device 3 a signal (hereinafter referred to as "a switch signal") that indicates turning on/off a power supply supplied from the power supply device 3 to the PC 4, and receives an RGB signal from the PC 4; a control unit 102 (first to third determination portions, a discard portion, and an output portion) that controls the entire power supply controlling apparatus 1; a USB port 103 that inputs a power supply output from the PC 4 via a USB (Universal Serial Bus) cable; an RS-232c port 104 that is connectable to peripheral equipment, not shown; a PS/2 port 105 that is connectable to a mouse 6; a PS/2 port 106 that is connectable to a keyboard 7; a video port 107 that is connectable to a monitor 8; a LAN port 108 that is connected to the LAN cable 5; and a speaker 110. The control unit 102 is connected to the communication unit 101, the USB port 103, the RS-232c port 104, the PS/2 ports 105 and 106, the video port 107, the LAN port 108, and the speaker 110 via a system bus 109. The power supply controlling apparatus 1 may includes a plurality of LAN ports. Thereby, the power supply controlling apparatus 1 can connect to a plurality of remote devices via the plurality of LAN ports.

The remote device 2 includes: a control unit 201 that controls the entire remote device 2; an RS-232c port 202 that is connected to a printer 9; a PS/2 port 203 that is connected to a mouse 10; a PS/2 port 204 that is connected to a keyboard 11; a video port 205 that is connected to a monitor 12 (a display portion); a switch 206 that outputs a switch signal; a LAN port 207 that is connected to the LAN cable 5; and a speaker 209. The control unit 201 is connected to the RS-232c port 202, the PS/2 ports 203 and 204, the video port 205, the switch 206, and a speaker 209 (a sound output portion) via a system bus 208. The remote device 2 may includes a plurality of LAN ports. Thereby, the remote device 2 can connect to a plurality of power supply controlling apparatuses via the plurality of LAN ports.

Figure 2:
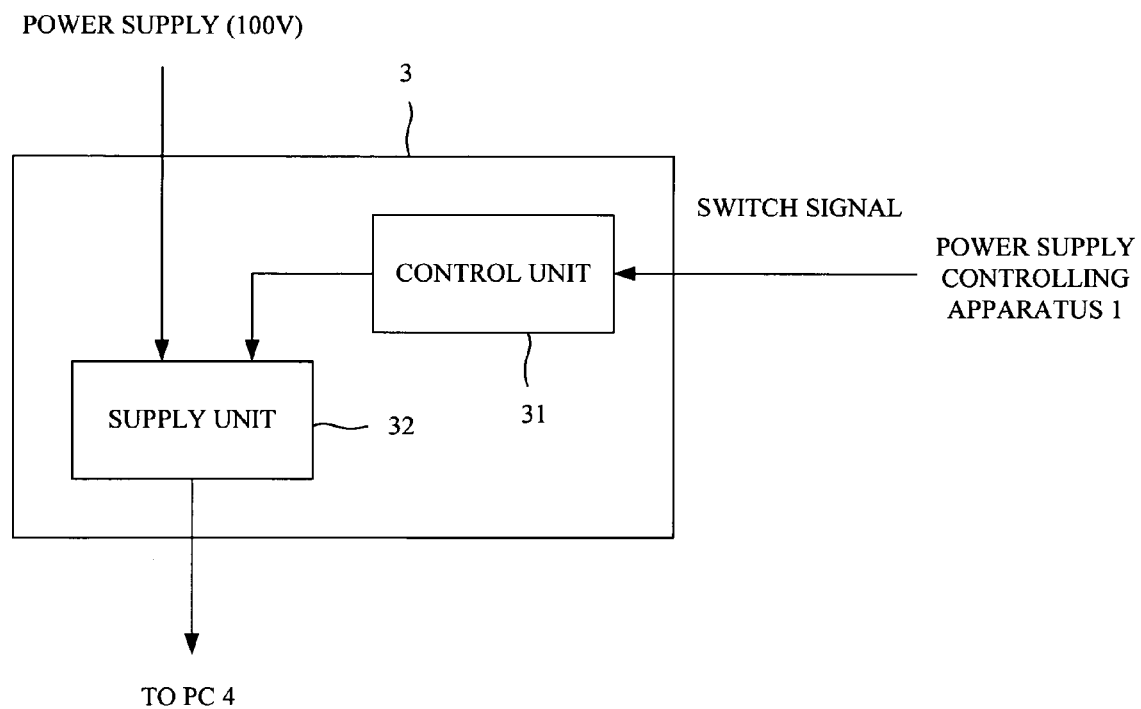
FIG. 2 is a schematic diagram showing the construction of a power supply device 3.

The power supply device 3 supplies the power supply of 100 volts to the PC 4 or cancels supplying the power supply of 100 volts, based on the switch signal transmitted from the switch 206 in the remote device 2 via the power supply controlling apparatus 1. FIG. 2 shows the construction of the power supply device 3. The power supply device 3 includes a control unit 31 and a supply unit 32. When the control unit 31 receives the switch signal that indicates turning on the power supply from the power supply controlling apparatus 1, the supply unit 32 supplies the power supply of 100 volts to the PC 4. When the control unit 31 receives the switch signal that indicates turning off the power supply from the power supply controlling apparatus 1, the supply unit 32 cancels supplying the power supply of 100 volts to the PC 4. That is, the switch 206 in the remote device 2 can controls the supply of the power supply from the power supply device 3 to the PC 4, or the cancel of the supply of the power supply via the LAN cable 5 and the power supply controlling apparatus 1.

When the power supply is supplied from the power supply device 3, the PC 4 transmits the RGB signal (including a red signal, a green signal, and a blue signal), a vertical synchronizing signal (Vsync), and a horizontal synchronizing signal (Hsync) to the power supply controlling apparatus 1. When the power supply is supplied from the power supply device 3, the PC 4 also supplies the power supply to the USB port 103 in the power supply controlling apparatus 1 via a USB port of the PC 4, not shown.

The power supply controlling apparatus 1 superimposes the horizontal synchronizing signal on the green signal, superimposes the vertical synchronizing signal on the blue signal, and transmits the two superimposed signals and the red signal to the remote device 2 via the LAN cable 5.

The remote device 2 receives the two superimposed signals and the red signal via the LAN cable 5, returns the two superimposed signals to the former signals (i.e., the horizontal synchronizing signal, the vertical synchronizing signal, the green signal and the blue signal), and outputs the RGB signal to the monitor 12 by using the vertical synchronizing signal and the horizontal synchronizing signal.

A mouse signal from the mouse 10 and a key signal from the keyboard 11 are transmitted to the PC 4 via the LAN cable 5 and the power supply controlling apparatus 1. When the printer 9 executes the printing, an instruction signal of the printing is transmitted from the mouse 10 or the keyboard 11 to the PC 4 via the LAN cable 5 and the power supply controlling apparatus 1, and a print command is transmitted from the PC 4 to the printer 9 via the LAN cable 5 and the power supply controlling apparatus 1. Thereby, the printing is executed with the printer 9.

Figure 3:
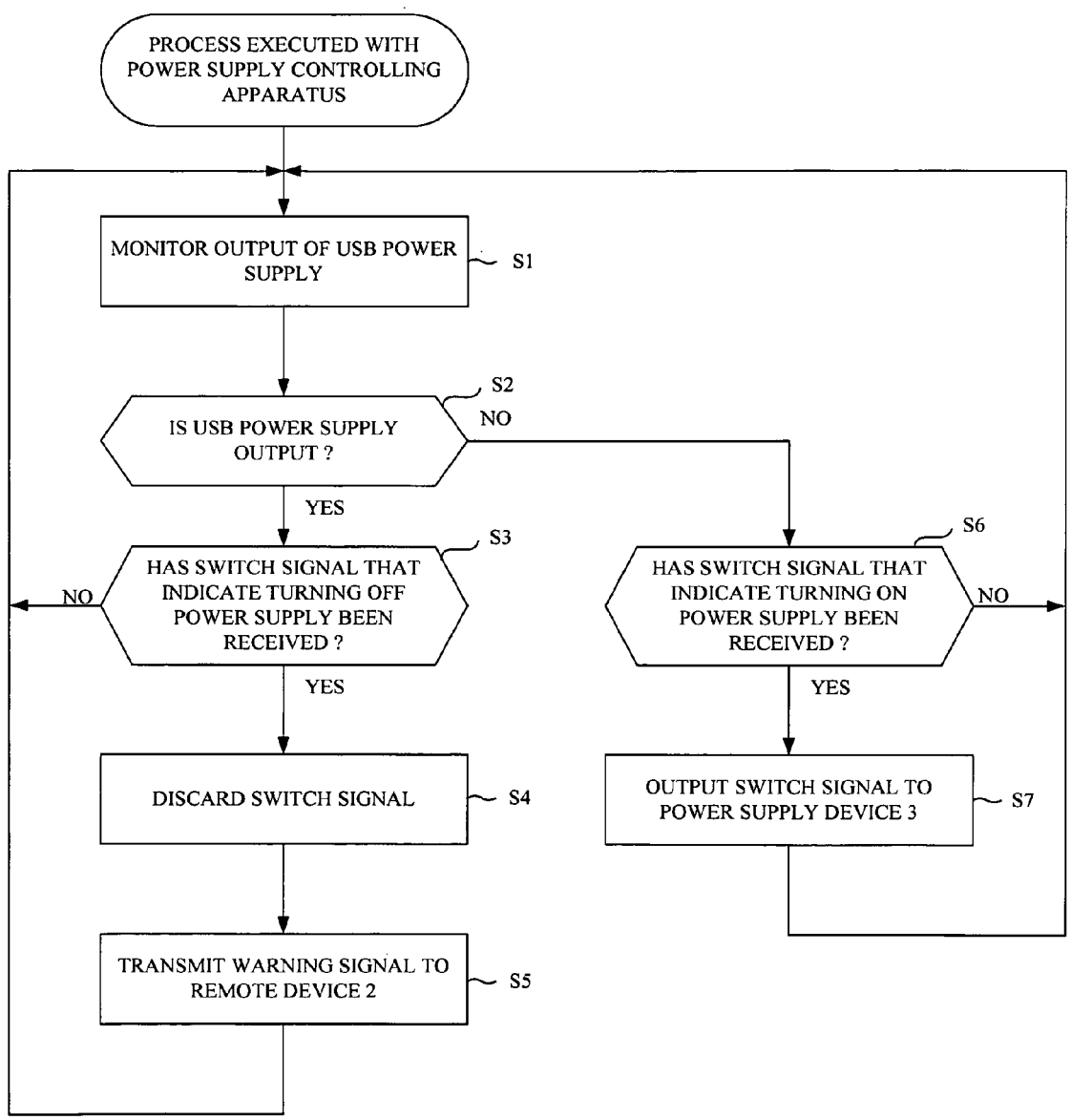
FIG. 3 is a flowchart showing a process executed with a power supply controlling apparatus 1.

FIG. 3 is a flowchart showing a process executed with the power supply controlling apparatus 1. When a user completes the operation of the power supply controlling system, the user specifies the operation completion of the present system on an OS (Operating System) being displayed on the monitor 12 of the remote device 2. Thereby, the remote device 2 outputs a signal showing the operation completion of the present system to the power supply device 3 via the power supply controlling apparatus 1, and the power supply device 3 completes the supply of the power supply to the PC 4. Then, the power supply of the PC 4 is turned off, and the operation of the power supply controlling system is completed.

First, the control unit 102 monitors the output of the power supply (hereinafter referred to as "USB power supply") from the PC 4 via the USB port 103 connected to the PC 4 (Step S1).

Next, the control unit 102 determines whether the USB power supply is output from the PC 4 (step S2). When the USB power supply is output from the PC 4, the power supply of the PC 4 is in an ON state, and when the USB power supply is output from the PC 4, the power supply of the PC 4 is in an OFF state.

When the answer to the determination of step S2 is "YES", the control unit 102 determines whether the switch signal (here, the signal that indicates turning off the power supply supplied from the power supply device 3 to the PC 4) has been received from the remote device 2 (step S3). When the answer to the determination of step S3 is "NO", the procedure returns to step S1.

When the answer to the determination of step S3 is "YES", the control unit 102 discards the switch signal (step S4). That is, the control unit 102 does not execute special operation even if the switch signal is received. This is because data of the PC 4 under operation is prevented from being deleted. Next, the control unit 102 transmits a warning signal to the remote device 2 via the LAN cable 5 (step S5), and the procedure returns to step S1. When the control unit 201 in the remote device 2 receives the warning signal, the control unit 201 outputs a warning display (e.g. a display of "PC 4 is under operation") to the monitor 12, or a warning sound from the speaker 209. Thereby, it is possible to notify a user of the remote device 2 that the switch 206 has been operated improperly.

In step S5, the control unit 102 may transmit the warning signal to the remote device 2, and output the warning display to the monitor 8 or the warning sound from the speaker 110. Thereby, it is possible to notify a user of the power supply controlling apparatus 1 that the switch 206 has been operated improperly.

When the answer to the determination of step S2 is "NO", the control unit 102 determines whether the switch signal (here, the signal that indicates turning on the power supply supplied from the power supply device 3 to the PC 4) has been received from the remote device 2 (step S6). When the answer to the determination of step S6 is "NO", the procedure returns to step S1. When the answer to the determination of step S6 is "YES", the control unit 102 outputs the switch signal to the power supply device 3 via the communication unit 101 (step S7), and the procedure returns to step S1. When the switch signal is output to the power supply device 3 in step S7, the power supply device 3 starts supplying the power supply, and the power supply of the PC 4 is turned on.

According to the procedures of "NO" to step S2, "YES" to step S6, and step 7, when the user depresses the switch 206 of the remote device 2 in the state where the PC 4 does not operate, the switch signal that indicates turning on the power supply of the power supply device 3 is output to the power supply device 3. Therefore, the power supply device 3 can supply the power supply to the PC 4.

Figure 4:
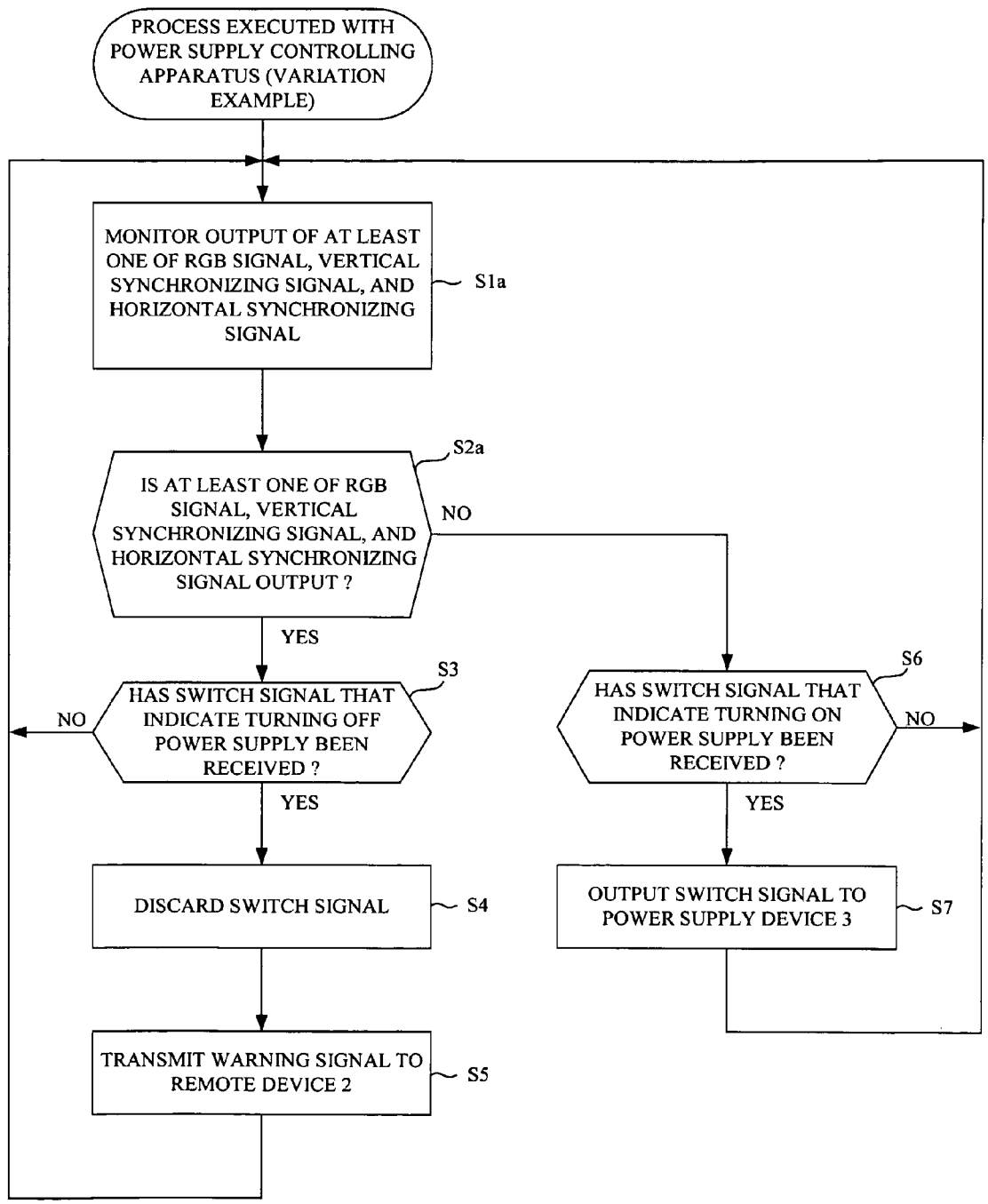
FIG. 4 is a flowchart showing a variation of the process executed with the power supply controlling apparatus 1.

FIG. 4 is a flowchart showing a variation of the process executed with the power supply controlling apparatus 1. Steps in FIG. 4 corresponding to those in FIG. 3 are designated by the same reference numerals, and description of these steps is omitted.

First, the control unit 102 monitors the output of at least one of the RGB signal, the horizontal synchronizing signal, and the vertical synchronizing signal from the PC 4 via the communication unit 101 connected to the PC 4 (step S1*a*).

Next, the control unit 102 determines whether at least one of the RGB signal, the horizontal synchronizing signal, and the vertical synchronizing signal is output (step S2*a*). Here, when at least one of these signals is output, the power supply of the PC 4 is in the ON state, and when at least one of these signals is not output, the power supply of the PC 4 is in the OFF state.

When the answer to the determination of step S2*a* is "YES", the procedure proceeds to step S3 described above, and when the answer to the determination of step S2*a* is "NO", the procedure proceeds to step S6 described above.

As described hereinabove, according to the present embodiment, the control unit 102 determines whether the USB power supply is output from the PC 4 (step S2). When it is determined that the USB power supply is output from the PC 4, the control unit 102 whether the switch signal that indicates turning off the power supply of the power supply device 3 has been received from the remote device 2 (step S3). When it is determined that the switch signal has been received from the remote device 2, the control unit 102 discards the switch signal (step S4). Thus, even when the user depresses the switch of the remote device 2 by accident while operating the PC 4, the switch signal is discarded. It is therefore possible to avoid controlling the power supply of the power supply device 3 by an erroneous instruction. Moreover, data that is being edited in the PC 4 can be prevented from being deleted by the user's erroneous instruction.

Also, the control unit 102 determines whether at least one of the RGB signal, the horizontal synchronizing signal, and the vertical synchronizing signal is output (step S2*a*). When it is determined that at least one of these signals is output, the control unit 102 whether the switch signal that indicates turning off the power supply of the power supply device 3 has been received from the remote device 2 (step S3). When it is determined that the switch signal has been received from the remote device 2, the control unit 102 discards the switch signal (step S4). Thus, even when the user depresses the switch of the remote device 2 by accident while operating the PC 4, the switch signal is discarded. It is therefore possible to avoid controlling the power supply of the power supply device 3 by an erroneous instruction. Moreover, data that is being edited in the PC 4 can be prevented from being deleted by the user's erroneous instruction.

It should be noted that the present invention is not limited to the embodiment, and various modifications may be made to them without departing from the scope of the invention.

The Present application is based on Japanese Patent Application No. 2008-046874 filed Feb. 27, 2008, the entire disclosure of which is hereby incorporated by reference.

What is claimed is:

1. A power supply controlling apparatus comprising:
    a first determination portion that determines whether a power supply is output from an information processing apparatus that outputs a video signal and is connected to the power supply controlling apparatus;
    a second determination portion that, when it is determined that the power supply is output from the information processing apparatus, determines whether a switch signal that indicates turning off a power supply of a power supply device supplying the power supply to the information processing apparatus has been received from a remote device outputting the switch signal in response to the depression of a switch, the power supply device and the remote device being connected to the power supply controlling apparatus; and
    a discard portion that discards the switch signal when it is determined that the switch signal has been received from the remote device.

2. The power supply controlling apparatus as claimed in claim 1, further comprising a third determination portion that determines whether a switch signal that indicates turning on the power supply of the power supply device has been received from the remote device when it is determined that the power supply is not output from the information processing apparatus, and an output portion that outputs the switch signal that indicates turning on the power supply of the power supply device to the power supply device when it is determined that the switch signal has been received from the remote device.

3. The power supply controlling apparatus as claimed in claim 1, wherein the remote device includes a sound output portion that outputs a warning sound or a display portion that displays warning information, and the power supply controlling apparatus transmits a warning signal to the remote device such that the sound output portion outputs the warning sound or the display portion displays the warning information.

4. A power supply controlling apparatus comprising:
    a first determination portion that determines whether at least one of an RGB signal, a vertical synchronizing signal and a horizontal synchronizing signal is output from an information processing apparatus that outputs a video signal composed of the RGB signal, the vertical synchronizing signal and the horizontal synchronizing signal, and is connected to the power supply controlling apparatus;
    a second determination portion that, when it is determined that the at least one of the RGB signal, the vertical synchronizing signal and the horizontal synchronizing signal is output from the information processing apparatus, determines whether a switch signal that indicates turning off a power supply of a power supply device supplying the power supply to the information processing apparatus has been received from a remote device, the power supply device and the remote device being connected to the power supply controlling apparatus; and
    a discard portion that discards the switch signal when it is determined that the switch signal has been received from the remote device.

5. The power supply controlling apparatus as claimed in claim 4, further comprising a third determination portion that determines whether a switch signal that indicates turning on the power supply of the power supply device has been received from the remote device when it is determined that the at least one of the RGB signal, the vertical synchronizing signal and the horizontal synchronizing signal is not output from the information processing apparatus, and an output portion that outputs the switch signal that indicates turning on the power supply of the power supply device to the power supply device when it is determined that the switch signal has been received from the remote device.

6. The power supply controlling apparatus as claimed in claim 4, wherein the remote device includes a sound output portion that outputs a warning sound or a display portion that displays warning information, and the power supply controlling apparatus transmits a warning signal to the remote device such that the sound output portion outputs the warning sound or the display portion displays the warning information.

7. A power supply controlling system comprising:
    a remote device that outputs a switch signal that indicates turning on or off a power supply of a power supply device in response to the depression of a switch; and
    a power supply controlling apparatus including:
    a first determination portion that determines whether a power supply is output from an information processing apparatus that outputs a video signal and is connected to the power supply controlling apparatus;
    a second determination portion that, when it is determined that the power supply is output from the information processing apparatus, determines whether the switch signal that indicates turning off the power supply of the power supply device supplying the power supply to the information processing apparatus has been received from the remote device, the power supply device and the remote device being connected to the power supply controlling apparatus; and a discard portion that discards the switch signal when it is determined that the switch signal has been received from the remote device.

8. A power supply controlling system comprising:

a remote device that outputs a switch signal that indicates turning on or off a power supply of a power supply device in response to the depression of a switch; and a power supply controlling apparatus including:

a first determination portion that determines whether at least one of an RGB signal, a vertical synchronizing signal and a horizontal synchronizing signal is output from an information processing apparatus that outputs a video signal composed of the RGB signal, the vertical synchronizing signal and the horizontal synchronizing signal, and is connected to the power supply controlling apparatus;

a second determination portion that, when it is determined that the at least one of the RGB signal, the vertical synchronizing signal and the horizontal synchronizing signal is output from the information processing apparatus, determines whether the switch signal that indicates turning off the power supply of the power supply device supplying the power supply to the information processing apparatus has been received from the remote device, the power supply device and the remote device being connected to the power supply controlling apparatus; and a discard portion that discards the switch signal when it is determined that the switch signal has been received from the remote device.

\* \* \* \* \*